(12) United States Patent
Baym et al.

(10) Patent No.: US 9,587,482 B2
(45) Date of Patent: Mar. 7, 2017

(54) MINING DRILL WITH GRADIENT SENSING AND METHOD OF USING SAME

(71) Applicant: Elwha LLC, Bellevue, WA (US)

(72) Inventors: Michael H. Baym, Cambridge, MA (US); Terry Briggs, Lone Tree, CO (US); Clark J. Gilbert, Denver, CO (US); W. Daniel Hillis, Encino, CA (US); Roderick A. Hyde, Redmond, WA (US); Muriel Y. Ishikawa, Livermore, CA (US); Jordin T. Kare, Seattle, WA (US); Conor L. Myhrvold, Bellevue, WA (US); Nathan P. Myhrvold, Bellevue, WA (US); Tony S. Pan, Cambridge, MA (US); Clarence T. Tegreene, Bellevue, WA (US); Charles Whitmer, North Bend, WA (US); Lowell L. Wood, Jr., Bellevue, WA (US); Victoria Y. H. Wood, Livermore, CA (US)

(73) Assignee: Elwha LLC, Bellevue, WA (US)

( * ) Notice: Subject to any disclaimer, the term of this patent is extended or adjusted under 35 U.S.C. 154(b) by 184 days.

(21) Appl. No.: 14/500,560

(22) Filed: Sep. 29, 2014

(65) Prior Publication Data
US 2015/0014057 A1    Jan. 15, 2015

Related U.S. Application Data

(63) Continuation of application No. 13/631,601, filed on Sep. 28, 2012, now Pat. No. 8,857,539.

(51) Int. Cl.
*E21B 7/04* (2006.01)
*E21B 10/66* (2006.01)
*E21B 47/12* (2012.01)
*E21B 47/026* (2006.01)
*E21B 47/00* (2012.01)
*E21B 7/06* (2006.01)
*E21B 44/00* (2006.01)
*E21B 47/022* (2012.01)
*E21B 49/06* (2006.01)

(52) U.S. Cl.
CPC .............. *E21B 47/026* (2013.01); *E21B 7/04* (2013.01); *E21B 7/06* (2013.01); *E21B 44/00* (2013.01); *E21B 47/00* (2013.01); *E21B 47/022* (2013.01); *E21B 47/12* (2013.01); *E21B 49/06* (2013.01)

(58) Field of Classification Search
CPC ........ E21B 7/04; E21B 41/0042; E21B 47/12; E21B 10/66; E21B 41/0035
See application file for complete search history.

(56) References Cited

U.S. PATENT DOCUMENTS

| 7,650,937 | B2 | 1/2010 | Fox et al. |
| 7,656,342 | B2 | 2/2010 | Stolarczyk et al. |

(Continued)

*Primary Examiner* — Catherine Loikith
(74) *Attorney, Agent, or Firm* — Foley & Lardner LLP

(57) ABSTRACT

A drill for excavating a bore in the earth includes a steerable primary boring tool, a secondary boring tool and a sensor. The steerable primary boring tool is configured to excavate a primary bore. The secondary boring tool is configured to excavate a plurality of side bores that extend outward from the primary bore at a plurality of azimuthal locations around the primary bore. The sensor is configured to detect a mineral property in the earth adjacent each of the side bores.

35 Claims, 11 Drawing Sheets

(56) References Cited

U.S. PATENT DOCUMENTS

| | | | |
|---|---|---|---|
| 7,770,670 B2 * | 8/2010 | Gourley | E21B 10/32 |
| | | | 175/284 |
| 8,061,444 B2 | 11/2011 | Mullins et al. | |
| 8,463,549 B1 | 6/2013 | Selman et al. | |
| 2001/0052427 A1 | 12/2001 | Eppink et al. | |
| 2005/0034917 A1 | 2/2005 | Mathiszik et al. | |
| 2005/0056463 A1 * | 3/2005 | Aronstam | E21B 7/062 |
| | | | 175/61 |
| 2005/0171700 A1 | 8/2005 | Dean | |
| 2006/0020390 A1 | 1/2006 | Miller | |
| 2007/0039731 A1 | 2/2007 | Fox et al. | |
| 2008/0218400 A1 | 9/2008 | Stolarczyk et al. | |
| 2009/0236145 A1 | 9/2009 | Bennett et al. | |
| 2009/0288881 A1 * | 11/2009 | Mullins | E21B 47/022 |
| | | | 175/50 |

* cited by examiner

MINING DRILL WITH GRADIENT SENSING AND METHOD OF USING SAME

CROSS-REFERENCE TO RELATED PATENT APPLICATIONS

This application is a continuation of U.S. application Ser. No. 13/631,601, filed Sep. 28, 2012, which is incorporated herein by reference in its entirety.

BACKGROUND

Mining drills can be used to determine the location of valuable mineral deposits in the earth. There is a need for improved mining drills that are steerable to follow a mineral deposit.

SUMMARY

One exemplary embodiment relates to a drill for excavating a bore in the earth. The drill includes a steerable boring tool configured to excavate a bore and sensors coupled to the boring tool. The sensors are spaced apart from one another at multiple azimuthal locations around the steerable boring tool and the sensors are configured to detect a mineral property in the earth adjacent the steerable boring tool.

Another exemplary embodiment relates to a drill for excavating a primary bore in the earth and for drilling multiple side bores in the earth. The drill includes a steerable primary boring tool configured to excavate a primary bore, a secondary boring tool configured to excavate multiple side bores, wherein the side bores extend outward from the primary bore at multiple azimuthal locations around the primary bore, and a sensor configured to detect a mineral property in the earth adjacent each of the side bores.

Another exemplary embodiment relates to a drill for excavating a bore in the earth. The drill includes a steerable boring tool configured to excavate a bore, and a sensor coupled to the boring tool, the sensor configured to be rotatable among multiple azimuthal positions relative to the steerable boring tool to detect a mineral property in the earth adjacent the steerable boring tool at each of the azimuthal positions.

Another exemplary embodiment relates to a method of steering a boring tool to follow a mineral deposit. The method includes the steps of detecting a mineral property in the earth adjacent a boring tool at multiple azimuthal positions about the boring tool, determining an azimuthal position value-function associated with each of the azimuthal positions, wherein each azimuthal position value-function includes the mineral property detected at the associated azimuthal position as an input, comparing the azimuthal position value-functions, determining a laterally dependent value-function in response to the comparison of the azimuthal position value-functions, determining a preferred drilling direction in response to the laterally dependent value-function, and steering the boring tool in the preferred drilling direction.

Another exemplary embodiment relates to a method of steering a primary boring tool to follow a mineral deposit. The method includes the steps of excavating a primary bore with a primary boring tool, excavating multiple side bores with a secondary boring tool, wherein the side bores extend outward from the primary bore at multiple azimuthal locations around the primary bore, detecting a mineral property in the earth adjacent each of the side bores, determining an azimuthal position value-function associated with each of the side bores, wherein each azimuthal position value-function includes the detected mineral property from the associated side bore as an input, comparing the azimuthal position value-functions, determining a laterally dependent value-function in response to the comparison of the azimuthal position value-functions, determining a preferred drilling direction in response to the laterally dependent value-function, and steering the primary boring tool in the preferred drilling direction.

The invention is capable of other embodiments and of being practiced or being carried out in various ways. Alternative exemplary embodiments relate to other features and combinations of features as may be generally recited in the claims.

BRIEF DESCRIPTION OF THE FIGURES

The invention will become more fully understood from the following detailed description, taken in conjunction with the accompanying drawings, wherein like reference numerals refer to like elements, in which.

The skilled artisan will understand that the drawings primarily are for illustrative purposes and are not intended to limit the scope of the inventive subject matter described herein.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Figure 1:
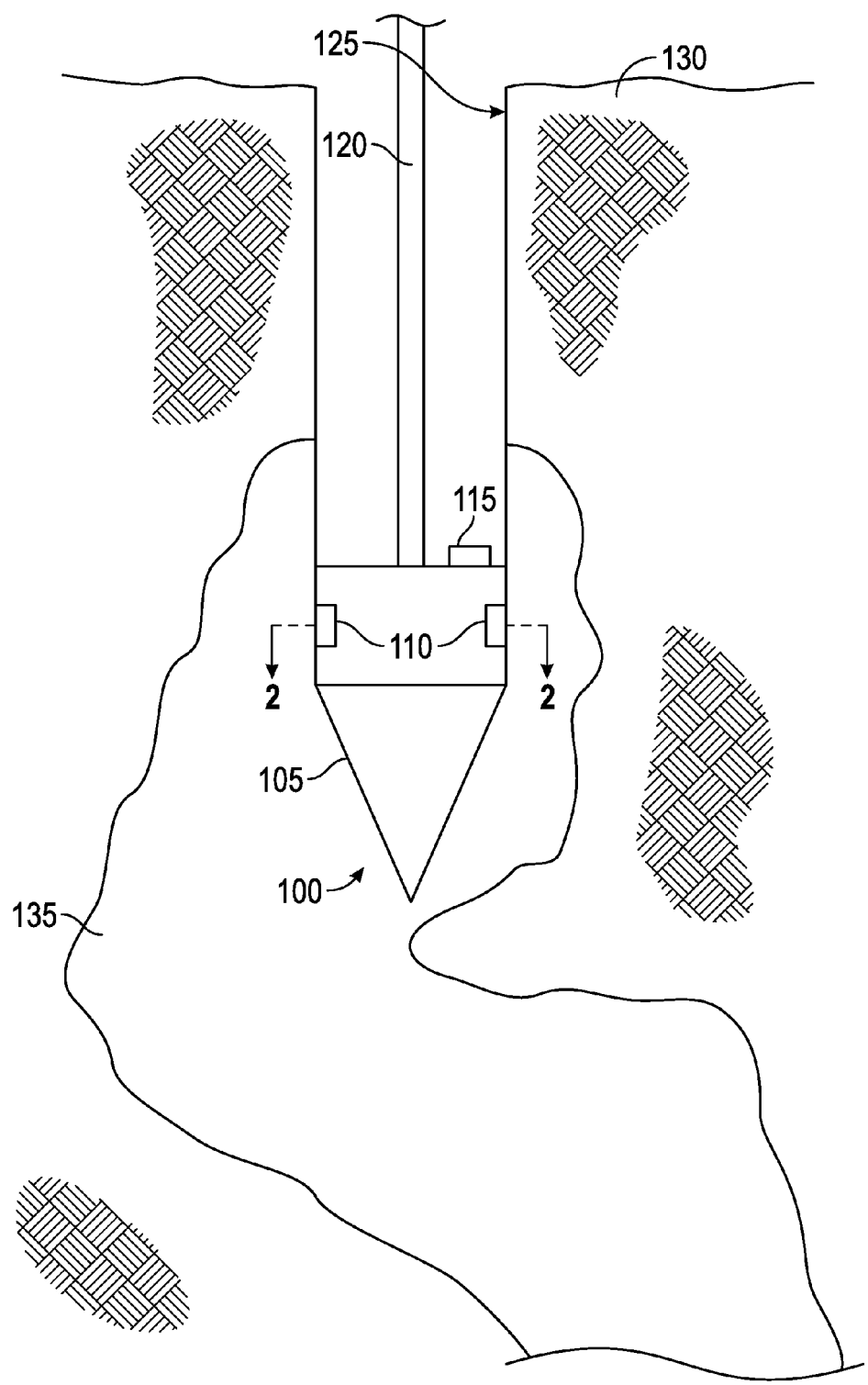
FIG. 1 is a schematic diagram of a drill, shown according to an exemplary embodiment.
Figure 2:
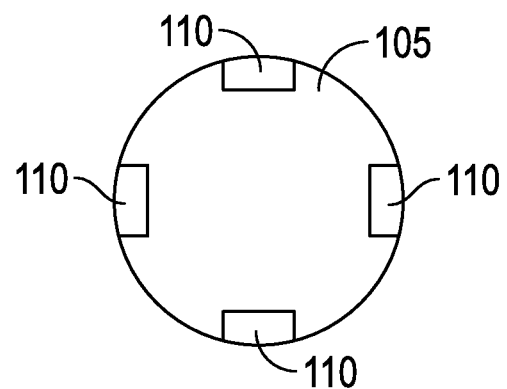
FIG. 2 is a sectional view of a portion of the drill of FIG. 1.
Figure 3:
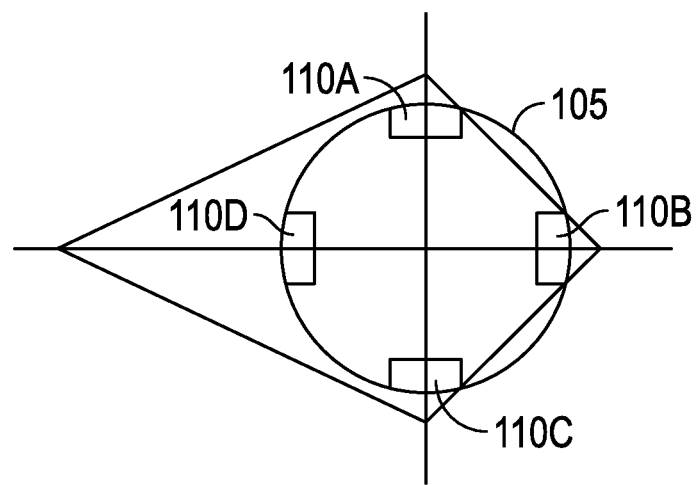
FIG. 3 is a sectional view of a portion of the drill of FIG. 1 overlayed on a plot showing concentration of a mineral property.
Figure 4:
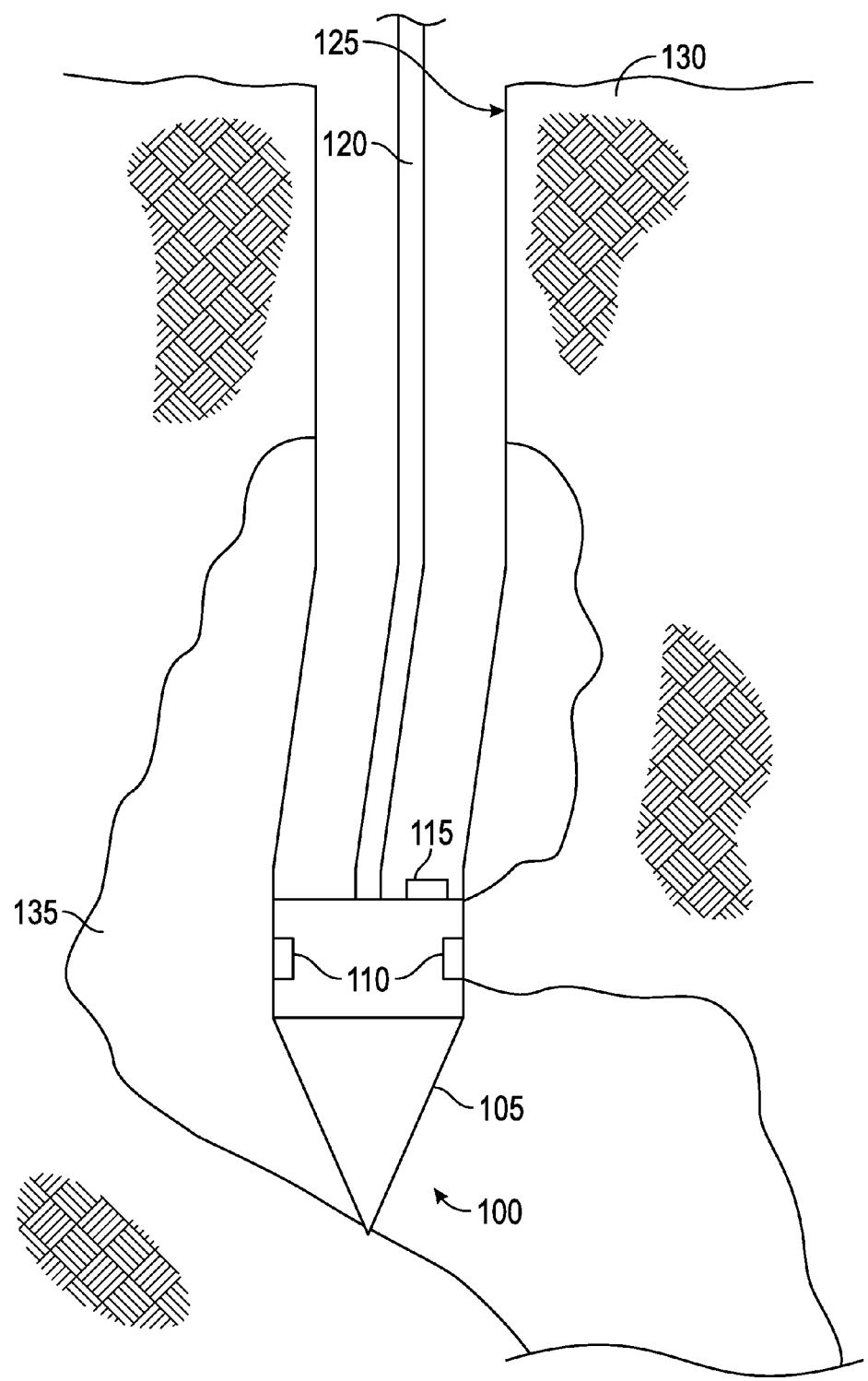
FIG. 4 is a schematic diagram of the drill of FIG. 1 at a different drilling position.

Referring to FIGS. 1-4, a steerable drill 100 is shown, according to an exemplary embodiment. The drill 100 includes a steerable boring tool 105, multiple sensors 110, a controller 115, and a support structure 120. The boring tool 105 is configured to excavate or drill a bore 125 in the earth 130. As shown in FIGS. 1 and 4, a mineral deposit 135 is found in the earth 130. The bore 125 may be vertical, horizontal, or inclined; it may follow a straight path or a curved one, which may or may not lie in a plane. Boring tool 105 is steerable so that a user or controller 115 can control the direction in which boring tool 105 drills. The verb "drill" is not intended to require the boring tool 105 to operate via rotational drilling, any method of forming or excavating a bore hole (such as using a rotational drill, a ram, a water jet, a laser, an explosively emplaced penetrator) is encompassed by the verb "drill".

As best shown in FIGS. 2-3, four sensors 110 are coupled at evenly spaced azimuthal locations around boring tool 105. Alternatively, more or fewer sensors 110 can be used. Sensors 110 are configured to detect a mineral property in earth 130 adjacent the steerable boring tool 105. The mineral property is indicative of a target mineral that the user of drill 100 wishes to mine. The mineral property can be the presence of the target mineral, a concentration of the target mineral, the presence of a mineral indicator (i.e., a material that indicates the presence of the target mineral), or a concentration of a mineral indicator. For example, gold may be the target mineral, and sulfide content, arsenic, carbon, or antimony are possible mineral indicators for gold. The mineral property can also be a characteristic of a background material. Background material is something other than the target mineral.

Sensors 110 may be selected from many types of borehole logging sensors, including elemental, chemical, fluorescent, spectroscopic, magnetic, density, sound speed, or resistance sensors. Additionally, sensors that make use of various forms of radiation (e.g., x-ray, gamma ray, acoustic, electromagnetic radiation) to detect the mineral property can be used. For example, sensors such as those disclosed in U.S. Pat. No. 7,650,937 and United States Patent Application Publication No. 2006/0020390 can be used. Both U.S. Pat. No. 7,650,937 and United States Patent Application Publication No. 2006/0020390 are herein incorporated by reference in their entirety.

An elemental sensor indicates the presence or concentration of the mineral. One version of an elemental sensor emits x-rays toward a mineral sample and detects returning x-rays from the sample that are distinctive of elements included in the minerals found in the sample.

A chemical sensor may perform a chemical test on a mineral sample to determine which mineral or minerals are present in the sample. The chemical sensor may be able to determine chemical compounds (e.g., volatiles, gangue, water) present in a mineral sample in addition to the individual minerals.

A fluorescent sensor emits a light toward a mineral sample and detects the spectrum of any returned fluorescent light. The spectrum is indicative of the minerals found in the sample.

A spectroscopic sensor emits a light toward a mineral sample and detects the spectrum of light reflected by or transmitted through the sample. The spectrum is indicative of the minerals found in the sample.

A magnetic sensor detects if a mineral sample is magnetic. It can detect ferromagnetic or paramagnetic materials, as well as properties such as permeability, hysteresis values, or magnetic resonances. Some target minerals and mineral indicators are magnetic.

A density sensor determines the density of a mineral sample. In some cases, the density sensor is used to identify the density of a background material or compound and not the density of the target mineral itself. For example, in a certain mine or geographic area, the target mineral may be known to likely be found in a background material of a known density. Identifying the location of background material having the known density should lead to the target mineral.

A sound speed sensor determines the speed of sound though a mineral sample. A sound speed sensor can be used in a manner similar to a density measurement sensor to identify a mineral itself, or detect a background material or compound having a known speed of sound and known to likely to contain the target mineral. The sound speed sensor is a specific embodiment of more general acoustic sensors, which can be used with this boring tool to detect acoustic scattering (at audible or ultrasonic frequencies) thereby detecting material interfaces, grain boundaries or grain sizes, porosity, or other configurational aspects of the materials.

A resistance sensor determines the electrical resistance or conductivity of a mineral sample. A resistance sensor can be used to identify a background material or compound having a known resistance or conductivity and known to likely contain the target mineral.

In the exemplary embodiment shown in FIGS. 1-4, a controller or processing circuit 115 is coupled to sensors 110. Controller 115 is configured receive inputs from sensors 110 and other sources, perform calculations or make other determinations, and produce outputs to control drill 100 or other functions. A processing circuit can include a processor and memory device. Processor can be implemented as a general purpose processor, an application specific integrated circuit (ASIC), one or more field programmable gate arrays (FPGAs), a group of processing components, or other suitable electronic processing components. Memory device (e.g., memory, memory unit, storage device, etc.) is one or more devices (e.g., RAM, ROM, Flash memory, hard disk storage, etc.) for storing data and/or computer code for completing or facilitating the various processes, layers and modules described in the present application. Memory device may be or include volatile memory or non-volatile memory. Memory device may include database components, object code components, script components, or any other type of information structure for supporting the various activities and information structures described in the present application. According to an exemplary embodiment, memory device is communicably connected to processor via processing circuit and includes computer code for executing (e.g., by processing circuit and/or processor) one or more processes described herein.

Support structure 120 couples boring tool 105 to a drilling rig or other structure (not shown).

Figure 5:
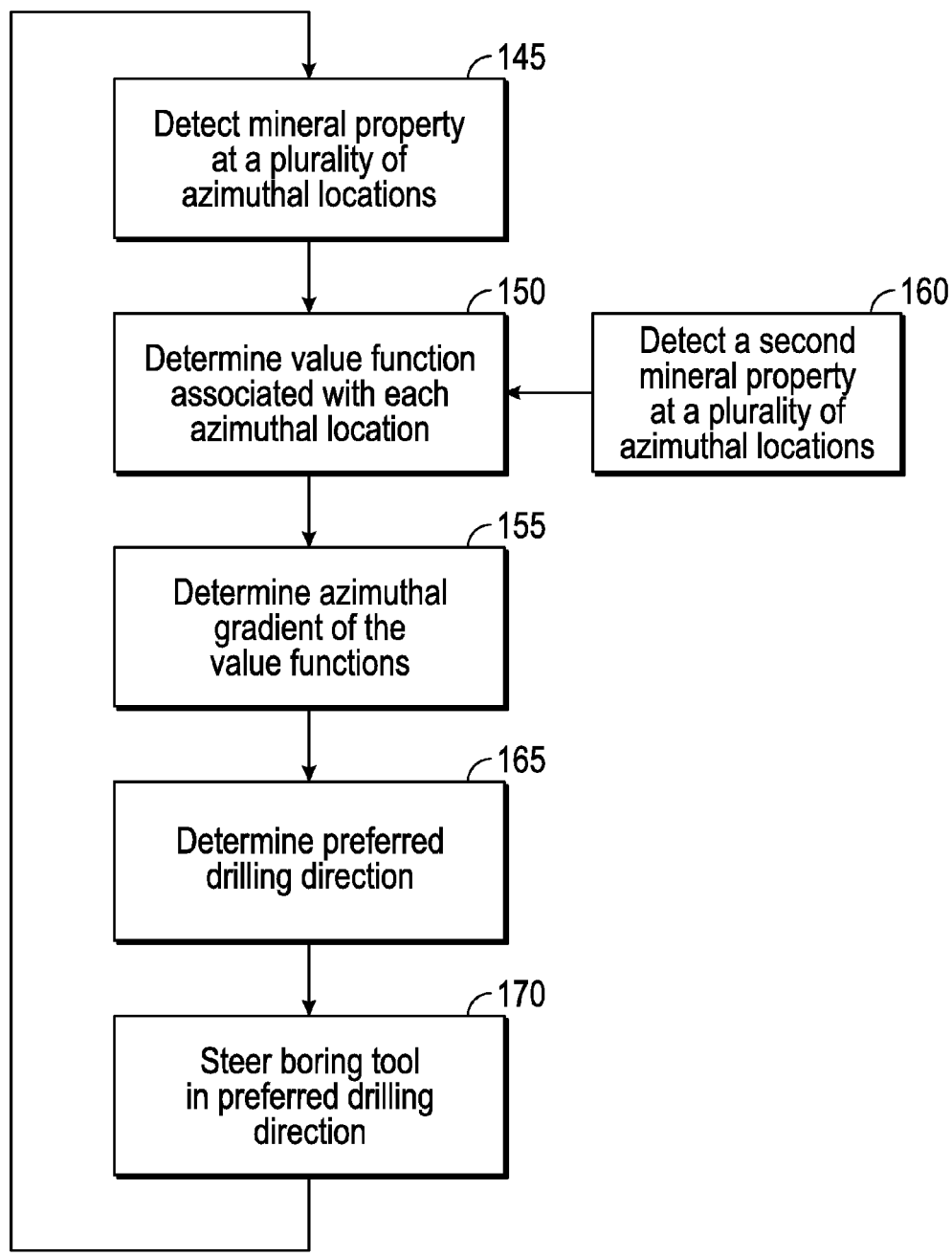
FIG. 5 is a flowchart of a method of steering the drill of FIG. 1.

Referring to FIG. 5, in a method according to an exemplary embodiment, boring tool 105 is steered to follow a mineral deposit 135 in response to a laterally dependent value function (e.g., an azimuthal or lateral gradient) of the mineral property determined by controller 115 in response to sensor value-functions determined by controller 115 using inputs provided by the sensors 110. First, each sensor 110 detects the mineral property found in the target section of earth 130 proximate that sensor 110 (step 145). Sensors 110 can be configured to detect the mineral property in the target section of earth 130 adjacent or immediately next to boring tool 105. Alternatively, sensors 110 can be configured to detect the mineral property in a target section of earth 130 distant from boring tool 105 (e.g., in a side bore, which will be explained in more detail in reference to drill 300 discussed below). Controller 115 receives an input from each of sensors 110 indicating the appropriate measurement of the mineral property (e.g., presence, property value, or concentration) found in the associated target section of earth 130.

Further referring to FIG. 5, controller 115 determines a sensor value-function associated with each of sensors 110 (step 150) and then determines a laterally dependent value-function in response to a comparison of sensor value-functions (step 155). In some embodiments, each sensor value-function uses only the detected mineral properties from associated sensor 110 for its input. The sensor value-function may be the sensed mineral property itself, or it may be a function of the property (e.g., a proportionality, a linear function, a monotonic function, a nonlinear function, an asymptotic function, a logarithmic function, or any other specified function). In some embodiments, the laterally dependent value-function can represent variation among sensor value-functions with respect to an azimuthal angle or can represent variation among the sensor value-functions along a specified lateral direction. The specified lateral direction can be along an axis orthogonal to that of the bore hole (i.e., x or y if the bore axis is z), can be along a vertical axis, can be along a horizontal axis, can be towards a targeted geological feature, or along other desired directions; the specified lateral direction need not be completely orthogonal to the bore axis. The laterally dependent value-function can be represent azimuthal variation of sensor value-functions by analytically interpolating between azimuth values corresponding to sensor measurements. This interpolation can be discontinuous or continuous. It can match the sensor value-functions at their azimuth angles (e.g., linearly interpolating between pairs of azimuths corresponding to sensor measurements). Alternatively, the laterally dependent value-function can involve an azimuthal curve fit (e.g., a smoothing, a spline fit, a Fourier filtration, etc.) to the sensor value-functions, which may or may not precisely match sensor value-functions at corresponding azimuths. An example of a laterally dependent value function of the mineral property in mineral deposit 135 at the drilling position shown in FIG. 1 is illustrated in FIG. 3 with boring tool 105 and sensors 110A-D shown over a plot showing the concentration of the target mineral (e.g., gold) detected by each of the sensors 110A-D. In the example shown in FIG. 3, sensors 110A and 110B detected the lowest concentration of gold, sensor 110C detected an intermediate concentration of gold, and sensor 110D detected the highest concentration of gold.

Alternatively, each sensor value-function includes one or more additional inputs. These additional inputs include negative factors such as a cost of recovering the mineral or a concentration or presence of a harmful material or toxin. For example, the targeted mineral may be more expensive to recover from a certain type of background material. The sensor value-function may include an input indicative of the background material and output a lower value when the cost of recovering the mineral is relatively high. Similarly, the sensor value-function may include an input indicative of a harmful material or toxin that could harm personnel or equipment and discount the output of the sensor value-function accordingly. In some embodiments, the sensor value function is determined by comparing the detected mineral property to a reference (e.g., a threshold where a detected mineral property above or below the threshold indicates the presence of the targeted mineral). Optionally, a second mineral property is detected at a plurality of azimuthal locations around the boring tool 105 (step 160). This second mineral property can be indicative of a negative factor. The second mineral property can be detected by a second set of sensors, such as those described below with respect to drill 200.

Referring still to FIG. 5, controller 115 or a user determines a preferred drilling direction in response to the laterally dependent value-function (step 165). Controller 115 provides an output indicative of the preferred drilling direction. In some embodiments, the preferred drilling direction can be in the direction of sensor 110 associated with the greatest sensor value-function, in the direction of sensor 110 associated with the highest concentration of the mineral property, in the direction of sensor 110 associated with a concentration of the mineral property above a threshold value, or in the direction of sensor 110 that detected a targeted feature. Examples of targeted features include an edge of a mineral deposit and a fracture zone. Sensors 110 can be configured to detect targeted features. In some embodiments, controller 115 compares the sensor value-functions from sensors 110 to determine the preferred drilling direction or otherwise determines the preferred drilling direction in response to the laterally dependent value-function. The comparison of the sensor-value functions can include an average, a weighted average, a nonlinear function, a filter and can also include constraints such as difficulty in changing the direction of boring tool 105, remaining within a specified region, or remaining along an overall direction.

In some embodiments, controller 115 compensates for noise in the value-functions before determining the preferred drilling direction. In some embodiments, controller 115 smoothes or filters the sensor value-functions and/or the laterally dependent value functions. One way to do so is to compare laterally dependent value-functions at different drilling positions of the boring tool along the bore hole when determining the preferred drilling direction. In some embodiments, the sensor value-function associated with each sensor 110 is considered cumulatively across multiple drilling positions (e.g. different depths) along the bore 125 formed by the boring tool 105. In other embodiments, a locally preferred drilling direction is determined at each drilling position and a preferred overall drilling direction can be determined based on laterally dependent value-functions at different drilling positions and/or based on sensor value-functions at different drilling positions. This can function to smooth or filter out outliers or other potentially erroneous results of the sensor value-functions and/or the laterally dependent value functions. In some embodiments, the overall preferred drilling direction is selected from amongst a group of locally preferred drilling directions. In some embodiments, locally preferred drilling directions are transformed into a common coordinate system (e.g., to compensate for rotation of the boring tool 105 relative to the main bore 125 or to compensate for curvature of the main bore 125).

Still referring to FIG. 5, boring tool 105 is then steered in the preferred drilling direction and drilling of bore 125 continues (step 170). As shown in FIG. 4, boring tool 105 has been steered to follow mineral deposit 135 in earth 130. Step 145 is then returned to as needed. In this way, drill 100 prospects by following a preferred path (which may include a most valuable path) of the mineral property through earth 130.

Figure 6:
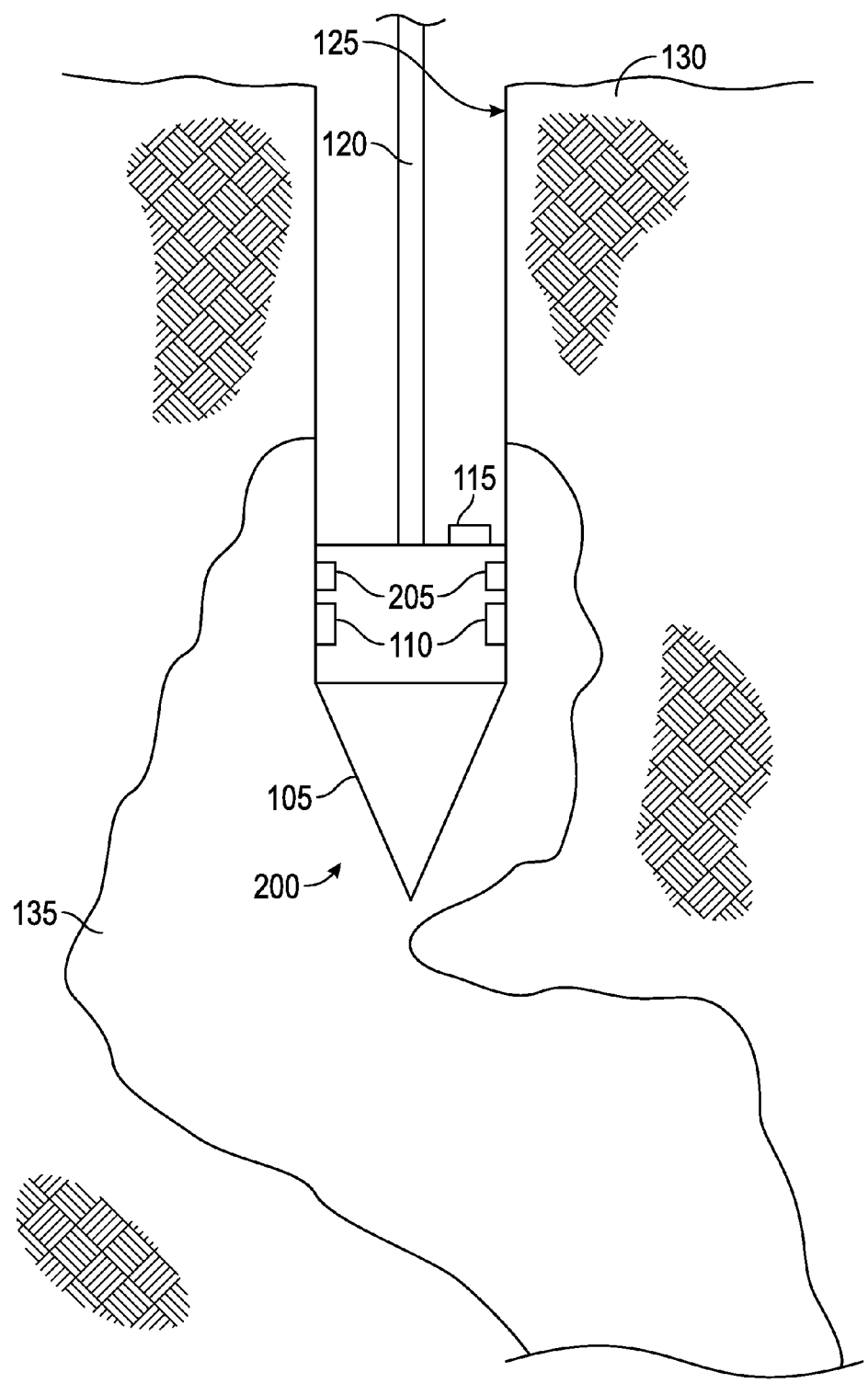
FIG. 6 is a schematic diagram of a drill, shown according to an exemplary embodiment.

Referring to FIG. 6, a drill 200 including multiple second sensors 205 is shown according to another exemplary embodiment. Except as explained below, drill 200 functions similarly to drill 100 described above. Second sensors 205 are configured to detect a different mineral property than first sensors 110. Each second sensor 205 is associated with one of first sensors 110 so that each sensor value-function is determined by inputs provided by one of first sensors 110 and one of second sensors 205. Alternatively, a second sensor value function is determined independent of the first sensor value function and uses the mineral property detected by the second sensor as an input.

Figure 7:
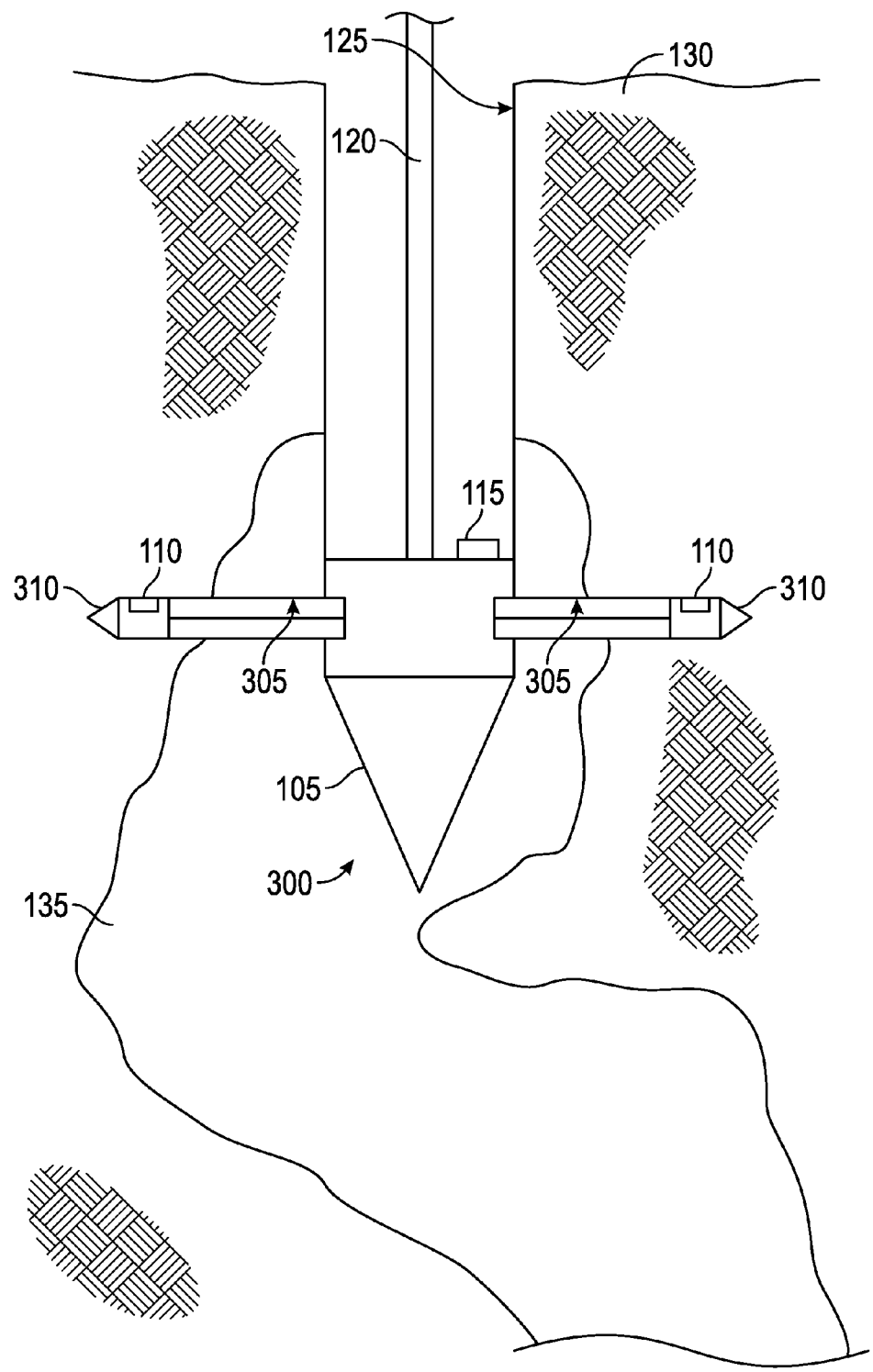
FIG. 7 is a schematic diagram of a drill, shown according to an exemplary embodiment.
Figure 8:
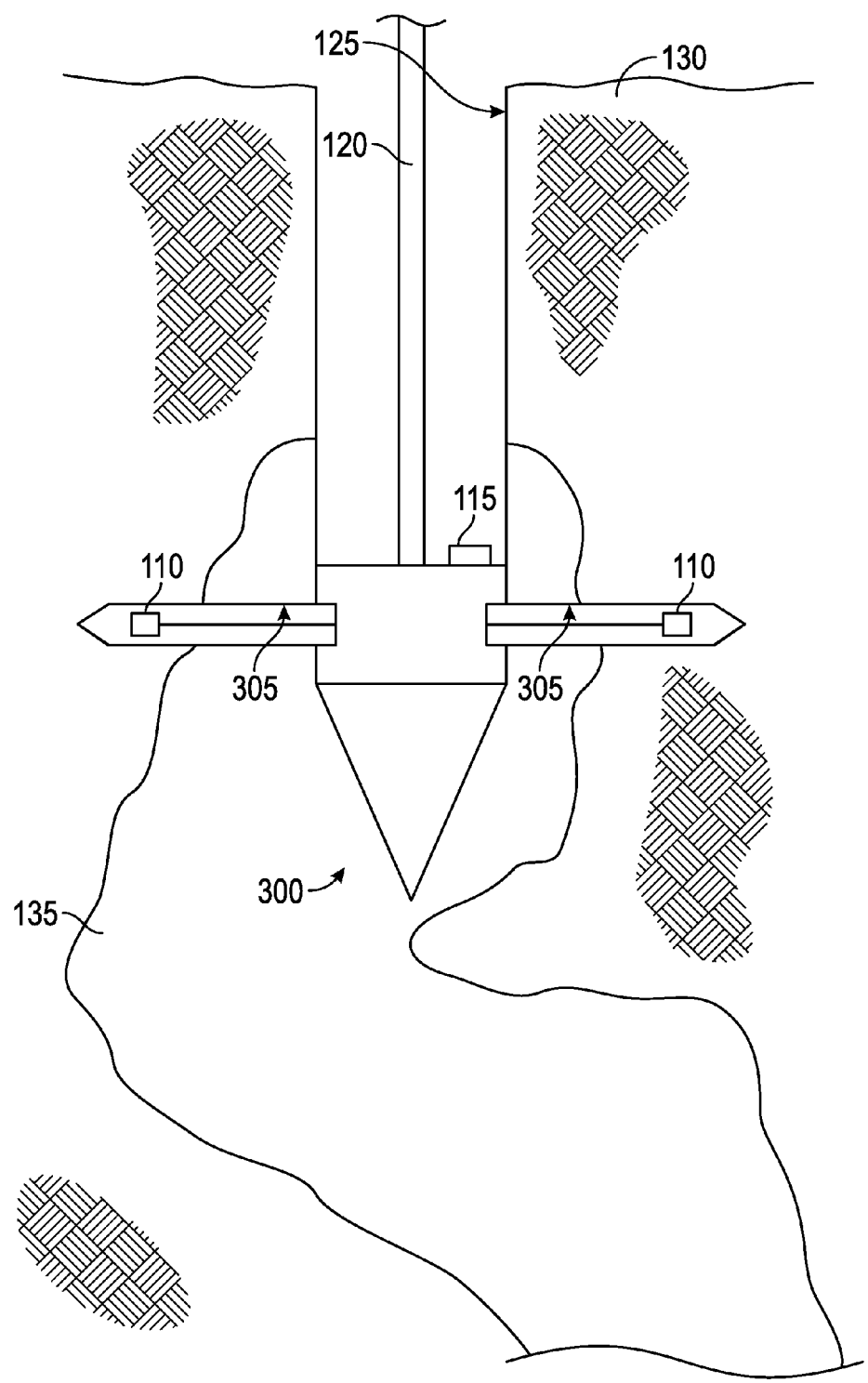
FIG. 8 is a schematic diagram of the drill of FIG. 7.
Figure 9:
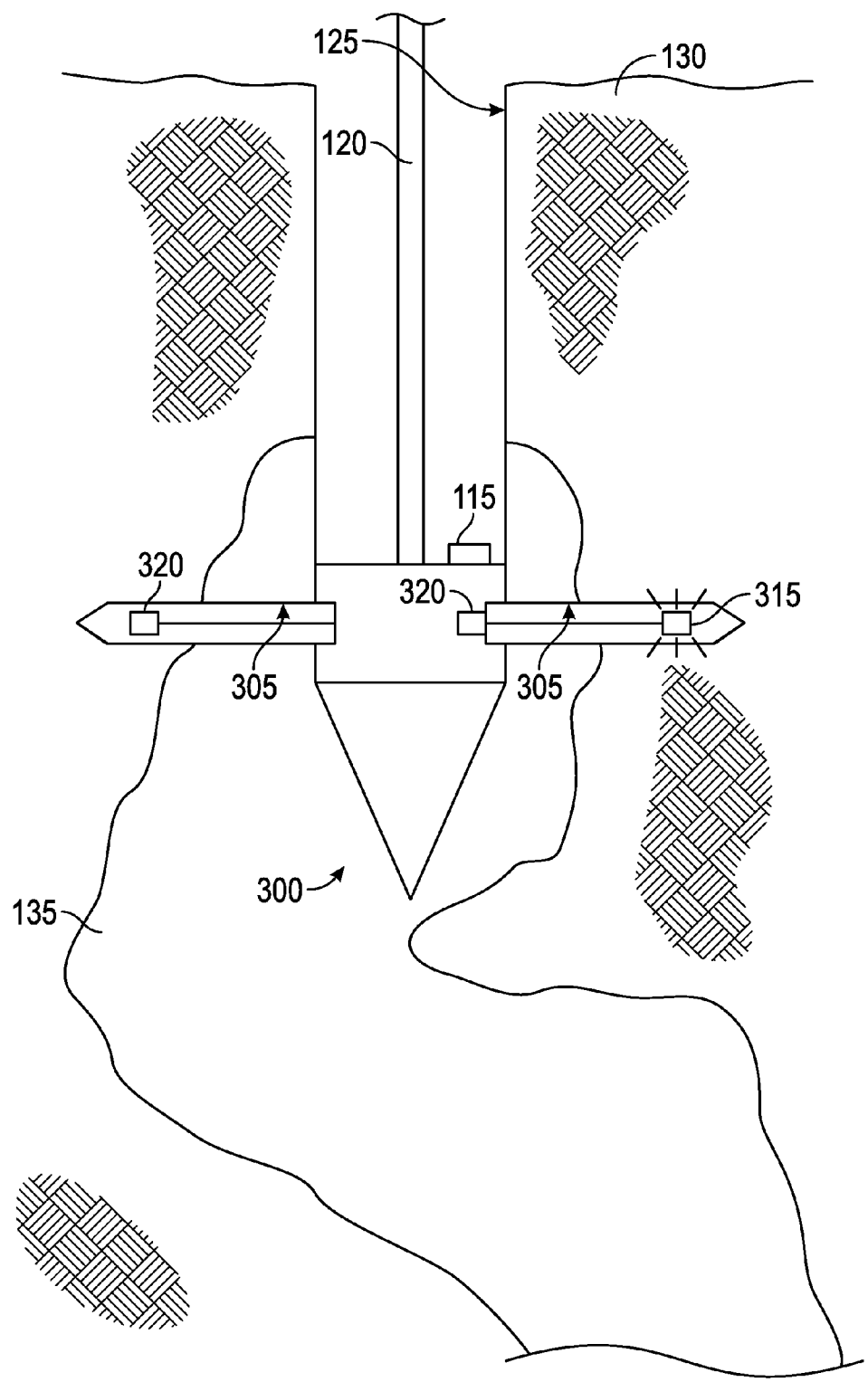
FIG. 9 is a schematic diagram of the drill of FIG. 7.

Referring to FIGS. 7-9, a drill 300 configured to make measurements in side bores 305 is illustrated. Except as explained below, the drill 300 functions similarly to drill 100 described above. Drill 300 includes one or more secondary boring tools 310 in addition to primary boring tool 105. Secondary boring tool 310 is used to excavate or drill side bores 305 in earth 130. Side bores 305 extend outward from primary bore 125. One or more side bores 305 are drilled at different azimuthal locations relative to the primary bore 125. The outwardly-extending side bores 305 can include a radial component, a longitudinal component, and/or a azimuthal component relative to the primary bore 125. After or while drilling a side bore 305, a sensor 110 aligned with side bore 305 detects the mineral property in earth 130 adjacent side bore 305. In this way, the mineral property is detected at a distance from primary boring tool 105, which provides for mineral property detection across a wider diameter than when detecting the mineral property adjacent primary boring tool 105. Secondary boring tool 310 can be a drill, a ram, a water jet, a laser, or an explosive emplaced penetrator (e.g., a solid projectile or an explosively shaped projectile), among other material penetration tools, i.e., it functions to excavate the side bore 305, and may or may not do so via a rotational drilling action.

As shown in FIG. 7, a sensor 110 is coupled to secondary boring tool 310 and is inserted into side bore 305 with secondary boring tool 310. As shown in FIG. 8, sensor 110 is inserted into side bore 305 after side bore 305 has been drilled by secondary boring tool 310. By inserting sensor 110 into side bore 305 either with secondary boring tool 310 or alone, sensor 100 can take readings for the mineral property at various locations along side bore 305. As illustrated in FIG. 9, sensor 110 includes a source of radiation 315 and a receiver 320 configured to detect the radiation given off by the source of radiation 315. The radiation can be x-ray, gamma ray, acoustic, magnetic, or electric radiation. In use, source of radiation 315 is positioned in a side bore 305 and receiver 320 is coupled to primary boring tool 105 or positioned in a different side bore 305. Alternatively, receiver 320 is positioned in a side bore 305 and source 315 is coupled to primary boring tool 105. In some embodiments, sensor 110 is coupled to primary boring tool 105 and is aligned with side bore 305 to detect the mineral property in side bore 305. In a further alternative, drill 300 can include sensors 110 configured to detect different mineral properties, similar to drill 200 described above.

Controller 115 determines a side bore value-function including the mineral property detected by sensor 110 in the earth 130 proximate the associated side bore 305 for each of the side bores 305. The side bore value-function is similar to the sensor value function discussed above.

The laterally dependent value-function is determined by a comparison of side bore value-functions. In some embodiments, the laterally dependent value-function can be determined based on side bore value-functions associated multiple side bores 305 drilled at the same drilling position or depth along the primary bore 125 formed by the primary boring tool 105. For example, a drill 300 including multiple secondary boring tools 310 can drill sets of two or more side bores at multiple drilling positions. Alternatively, drill 300 can drill a single side bore 305 at a first drilling position and a second side bore 305 at a second drilling position and determine the laterally dependent value-function based on side bore value-functions associated with different drilling positions. For example, a drill 300 with a single secondary boring tool 310 and a single sensor 110 can be used in this way to determine laterally dependent value functions.

Figure 10:
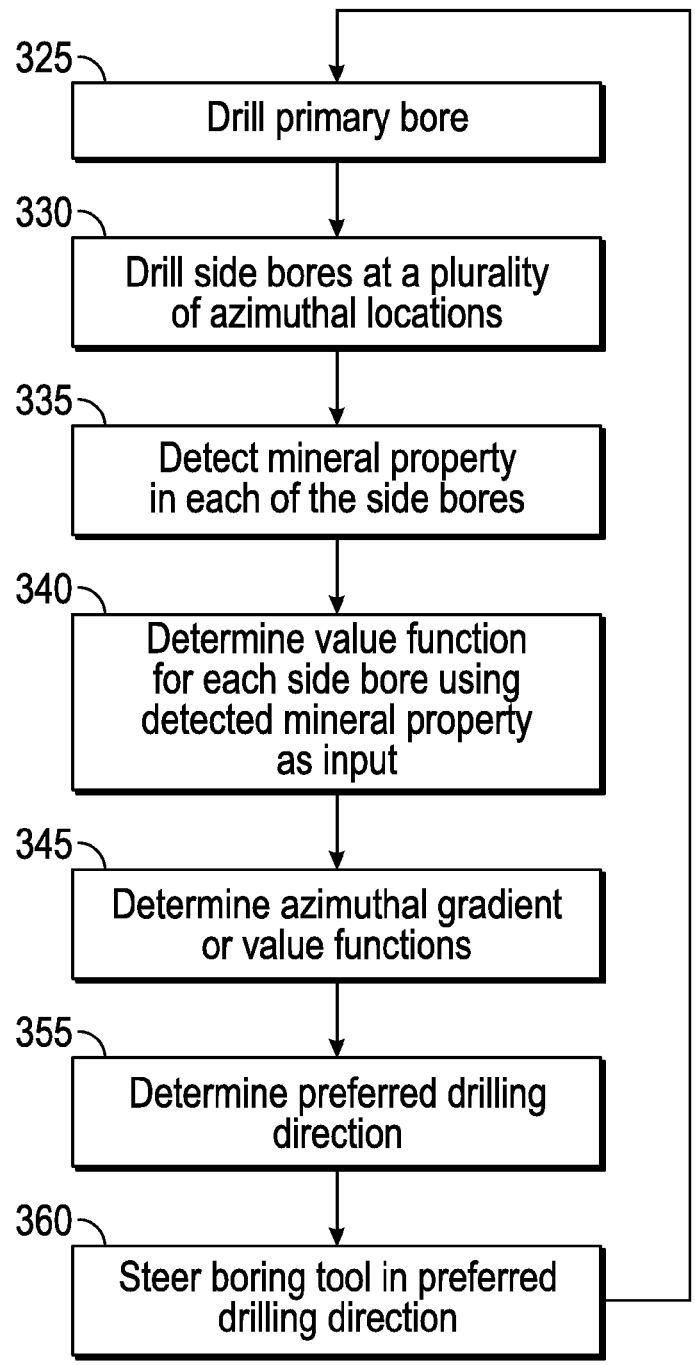
FIG. 10 is a flowchart of a method of steering the drill of FIG. 7.

Referring to FIG. 10, in a method according to one exemplary embodiment, drill 300 is used to follow a mineral deposit 135 in earth 130. First, a primary bore 125 is drilled with primary boring tool 105 (step 325). Then, a plurality of side bores 305 are drilled at different azimuthal locations around primary bore 125 (step 330). Side bores 305 can be drilled singly at different drilling positions along the bore hole or in sets of multiple side bores 305 at different drilling positions. A mineral property in earth 130 adjacent each of side bores 305 is then detected by a sensor 110 (step 335). Controller 115 then determines a side bore value-function associated with each of side bores 305 (step 340). Each side bore value-function includes the mineral property detected adjacent the associated side bore 305 as an input. Controller 115 determines a laterally dependent value function based on the side bore value-functions (step 345). Controller 115 or user then determines a preferred drilling direction in response to the azimuthal gradient (step 350). Primary boring tool 105 is then steered in the preferred drilling direction (step 355) before returning to step 325 as needed.

Figure 11:
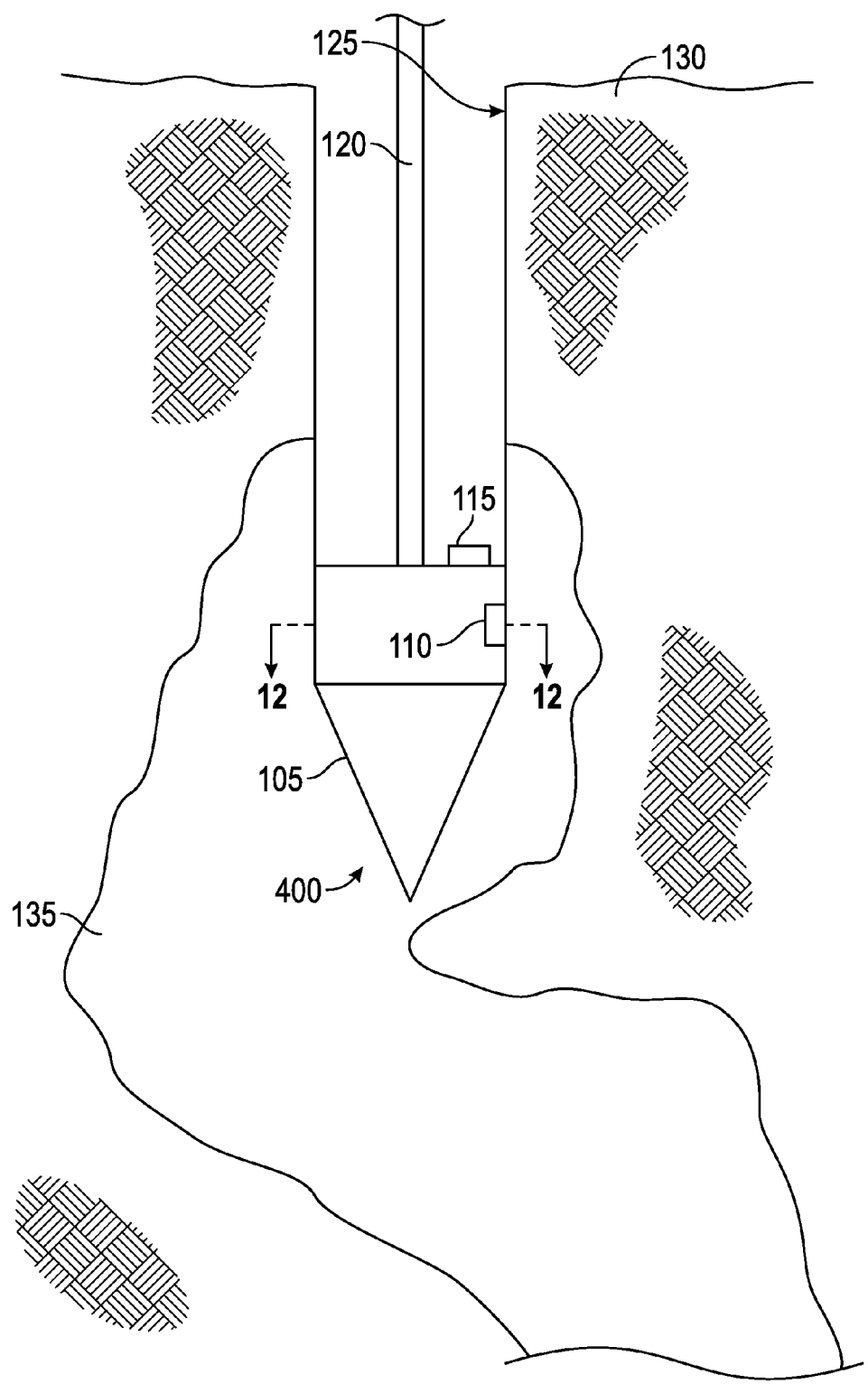
FIG. 11 is a schematic diagram of a drill, shown according to an exemplary embodiment.
Figure 12:
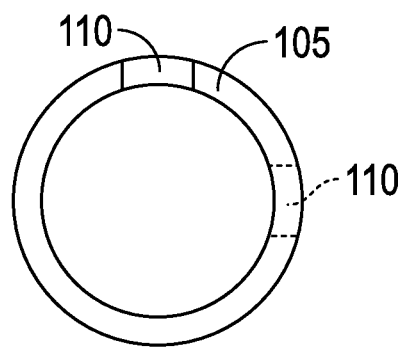
FIG. 12 is a section view of a portion of the drill of FIG. 11.

Referring to FIGS. 11-12, a steerable drill 400 is shown, according to an exemplary embodiment. Except as explained below, the drill 400 functions similarly to drill 100 described above. Drill 400 includes a single sensor 110 configured to detect mineral property in the earth 130 adjacent the steerable boring tool 105. Sensor 110 is rotatable among a plurality of azimuthal positions relative to the bore 125 so that sensor 110 detects the mineral property in the earth 130 adjacent steerable boring tool 105 at each of the azimuthal positions. The sensor may be rotationally mounted, so as to rotate relative to the boring tool 105 to desired azimuths, or it may be non-rotationally mounted on or attached to the boring tool 105, but utilize rotation of the boring tool 105 within the bore 125 to reach desired azimuthal positions. For example, in FIG. 12, sensor 110 is shown in a first azimuthal position in solid lines and in a second azimuthal position in dashed lines. For each azimuthal position, controller 115 determines an azimuthal position value function including the detected mineral property at the associated azimuthal position as an input. Azimuthal position value-functions are similar to sensor value-functions and side bore value-functions described above. The tem "azimuthal position value-function" can be used to refer any or all of sensor value-function, side bore value-function, and the just-described azimuthal position value-function. Laterally dependent value functions are determined based on azimuthal position value functions in manners similar to those described above. In some embodiments, steerable drill 400 also includes a second rotatable sensor configured to detect a second mineral property in the earth adjacent the steerable boring tool 105 at a plurality of azimuthal positions relative to the steerable boring tool 105.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show or the description may provide a specific order of method steps, the order of the steps may differ from what is depicted. Also two or more steps may be performed concurrently or with partial concurrence. Such variation will depend on various factors, including software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. It should be understood that the present application is not limited to the details or methodology set forth in the description or illustrated in the figures. It should also be understood that the terminology is for the purpose of description only and should not be regarded as limiting.

What is claimed is:

1. A drill for excavating a primary bore in the earth and for excavating a plurality of side bores in the earth, the drill comprising:
   a steerable primary boring tool configured to excavate a primary bore;
   a secondary boring tool configured to excavate a plurality of side bores, wherein the side bores extend outward from the primary bore at a plurality of azimuthal locations around the primary bore;
   a sensor configured to detect a mineral property in the earth adjacent each of the side bores; and
   a controller coupled to the sensor, the controller configured to compare the detected mineral property associated with each of the side bores to determine a locally preferred drilling direction.

2. The drill of claim 1,
   wherein the controller is further configured to determine the locally preferred drilling direction in response to the comparison, and provide an output indicative of the locally preferred drilling direction to the steerable primary boring tool.

3. The drill of claim 2, wherein the locally preferred drilling direction is toward the side bore associated with a highest detected concentration of the mineral property.

4. The drill of claim 2, wherein the locally preferred drilling direction is toward a side bore associated with a detected concentration of the mineral property above a threshold value.

5. The drill of claim 1, further comprising:
   a controller coupled to the sensor, the controller configured to compare the detected mineral property associated with each of the side bores at a plurality of sites along the primary bore, determine a locally preferred drilling direction in response to the comparison at each of the plurality of sites along the primary bore, determine a preferred overall drilling direction in response to the locally preferred drilling directions, and provide an output indicative of the preferred overall drilling direction to the steerable boring tool.

6. The drill of claim 1, wherein the sensor is coupled to the secondary boring tool.

7. The drill of claim 1, wherein the sensor is inserted into the side bore after the side bore is excavated by the secondary boring tool.

8. The drill of claim 1, wherein the sensor includes a source of radiation configured to be positioned in a side bore and a receiver configured to detect radiation given off by the source of radiation.

9. The drill of claim 8, wherein the receiver is configured to be positioned in the side bore.

10. The drill of claim 8, wherein the receiver is coupled to the primary boring tool.

11. The drill of claim 8, wherein the receiver is configured to be positioned in a side bore different than the side bore in which the source of radiation is positioned.

12. The drill of claim 8, wherein the radiation given off by the source of radiation is one of x-ray, gamma ray, acoustic, magnetic, and electric radiation.

13. The drill of claim 1, wherein the sensor includes a source of radiation coupled to the primary boring tool and a receiver configured to be positioned in each side bore and to detect radiation given off by the source of radiation.

14. The drill of claim 13, wherein the radiation given off by the source of radiation is one of x-ray, gamma ray, acoustic, magnetic, and electric radiation.

15. A drill for excavating a primary bore in the earth and for excavating a plurality of side bores in the earth, the drill comprising:
   a steerable primary boring tool configured to excavate a primary bore;
   a secondary boring tool configured to excavate a plurality of side bores, wherein the side bores extend outward from the primary bore at a plurality of azimuthal locations around the primary bore;
   a sensor configured to detect a mineral property in the earth adjacent each of the side bores; and
   a controller coupled to the sensor, the controller configured to:

determine a side bore value-function associated with each side bore where each side-bore value-function includes the mineral property detected by the sensor in the earth proximate the associated side bore as an input; and compare the side bore value-functions to determine a locally preferred drilling direction.

16. The drill of claim 15, wherein the controller is further configured to determine the locally preferred drilling direction as the direction having the greatest side bore value-function in response to the comparison.

17. The drill of claim 15, wherein the controller is further configured to determine the locally preferred drilling direction in response to the comparison, and provide an output indicative of the locally preferred drilling direction to the steerable primary boring tool.

18. The drill of claim 17, wherein the controller is further configured to compensate for noise in the side bore value-functions in determining the locally preferred drilling direction.

19. The drill of claim 15, wherein the controller is further configured to determine a laterally dependent value-function in response to the comparison, determine the locally preferred drilling direction in response to the laterally dependent value-function, and provide an output indicative of the locally preferred drilling direction to the steerable primary boring tool.

20. The drill of claim 19, wherein the laterally dependent value-function represents variation among the side bore value-functions with respect to an azimuthal angle.

21. The drill of claim 19, wherein the laterally dependent value-function represents variation among the side bore value-functions along a specified lateral direction.

22. The drill of claim 19, wherein the locally preferred drilling direction is the direction having the greatest side bore value-function.

23. The drill of claim 19, wherein the locally preferred drilling direction is a direction in which the side bore value-function is above a threshold value.

24. The drill of claim 19, wherein the locally preferred drilling direction is toward a detected targeted feature.

25. The drill of claim 24, wherein the targeted feature is an edge of a mineral deposit.

26. The drill of claim 24, wherein the targeted feature is a fracture zone.

27. The drill of claim 15, wherein the controller is further configured to compare the side bore value-functions at a plurality of sites along the primary bore, determine a preferred overall drilling direction in response to the comparison, and provide an output indicative of the overall preferred drilling direction to the steerable primary boring tool.

28. The drill of claim 15, wherein the controller is further configured to compare the side bore value-functions at a plurality of sites along the primary bore, determine a laterally dependent value-function in response to the comparison of the side bore value-functions at each of the plurality of sites along the primary bore, compare the laterally dependent value-functions, determine a preferred overall drilling direction in response to the comparison of the laterally dependent value-functions, and provide an output indicative of the preferred overall drilling direction to the steerable primary boring tool.

29. A method of steering a primary boring tool to follow a mineral deposit, the method comprising:

excavating a primary bore with a primary boring tool;

excavating a plurality of side bores with a secondary boring tool, wherein the plurality of side bores extend outward from the primary bore at a plurality of azimuthal locations around the primary bore;

detecting a mineral property in the earth adjacent each of the side bores;

determining an azimuthal position value-function associated with each of the side bores, wherein each azimuthal position value-function includes the detected mineral property from the associated side bore as an input;

comparing the azimuthal position value-functions;

determining a laterally dependent value-function in response to the comparison of the azimuthal position value-functions;

determining a preferred drilling direction in response to the laterally dependent value-function; and steering the primary boring tool in the preferred drilling direction.

30. The method of claim 29, wherein determining the azimuthal position value-function associated with each of the azimuthal positions includes comparing the detected mineral property at each of the azimuthal positions with a reference value.

31. The method of claim 29, wherein detecting the mineral property in each of the side bores includes detecting the mineral property with a sensor.

32. The method of claim 31, wherein the sensor is coupled to the secondary boring tool.

33. The method of claim 31, wherein detecting the mineral property in each of the side bores includes inserting the sensor into each side bore after each side bore is drilled by the secondary boring tool.

34. The method of claim 31, wherein the sensor includes a source of radiation and a receiver configured to detect radiation given off by the source of radiation.

35. The method of claim 34, wherein detecting the mineral property in each of the side bores includes positioning the source of radiation in the side bore.

* * * * *